Figure 1:
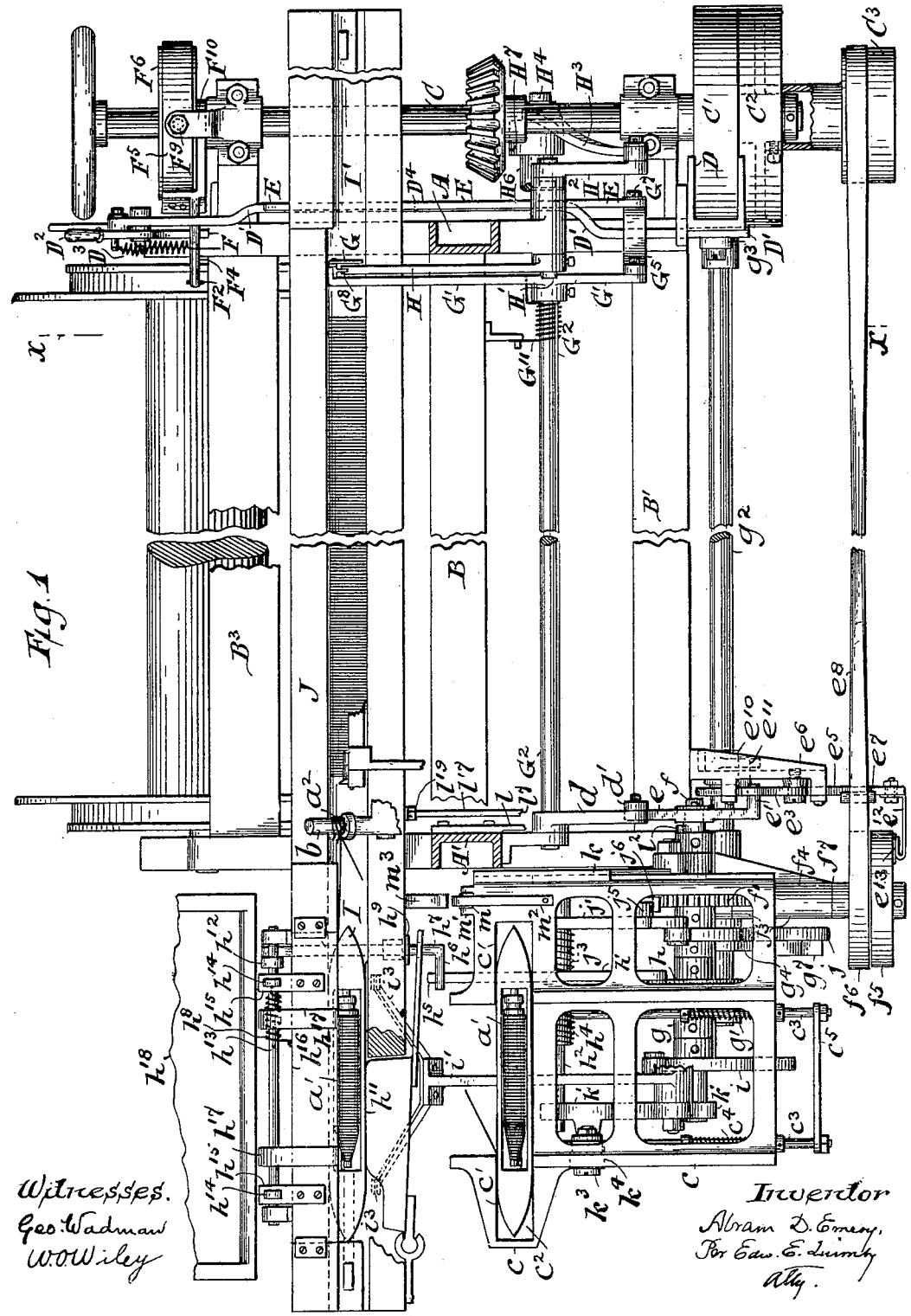

No. 626,860. Patented June 13, 1899.
A. D. EMERY.
STOPPING, CORRECTING, AND RESTARTING MECHANISM FOR LOOMS.
(Application filed Aug. 2, 1898.)

(No Model.) 7 Sheets—Sheet 1.

Witnesses.
Geo. Wadman
W. O. Wiley

Inventor
Abram D. Emery,
Per Edw. E. Lumby
Atty.

No. 626,860. Patented June 13, 1899.
A. D. EMERY.
STOPPING, CORRECTING, AND RESTARTING MECHANISM FOR LOOMS.
(Application filed Aug. 2, 1898.)
(No Model.) 7 Sheets—Sheet 3.

Witnesses.
Geo. Wadman
W.O.Wiley

Inventor.
Abram D. Emery,
Per Edw. E. Lundy,
Atty.

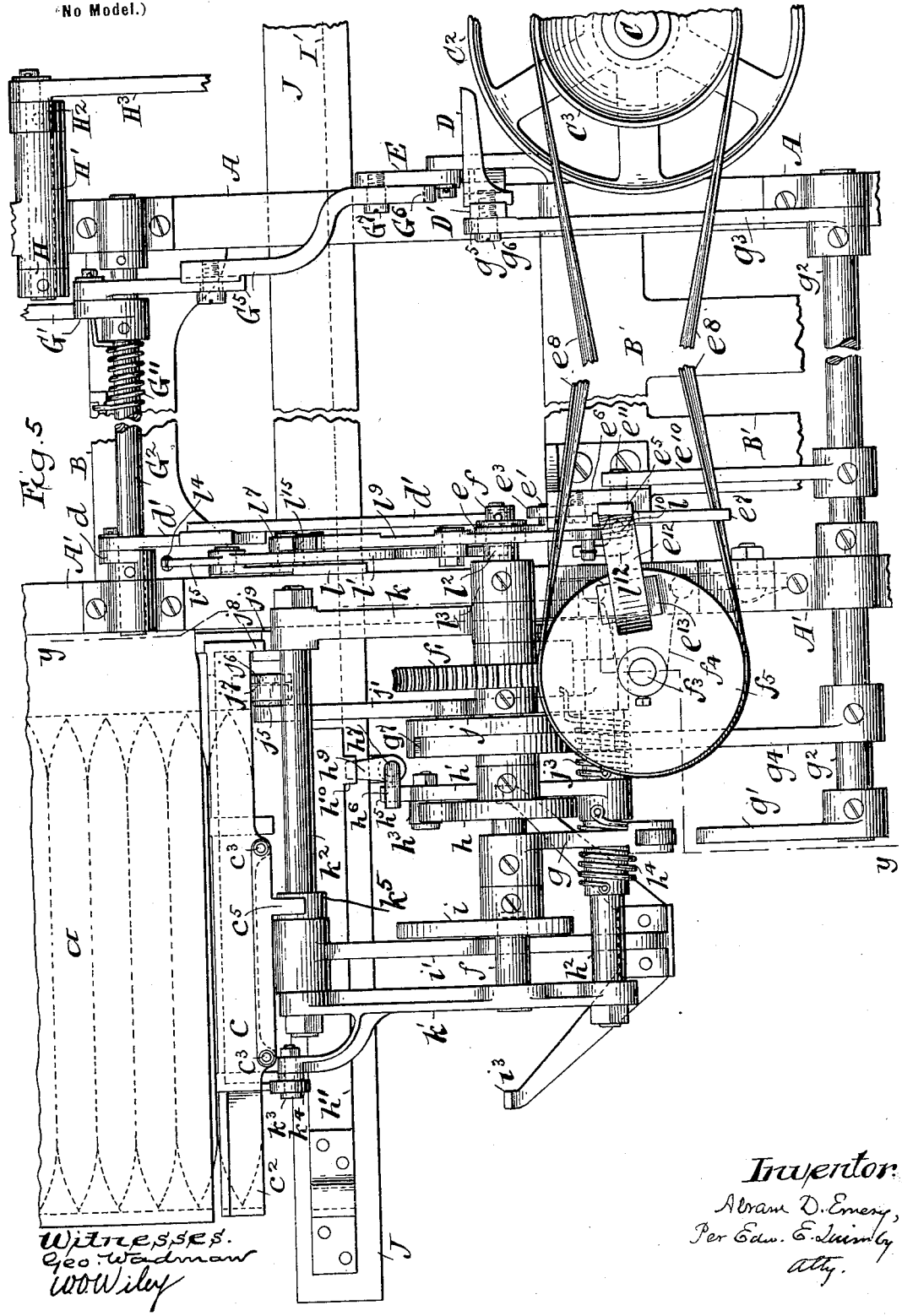

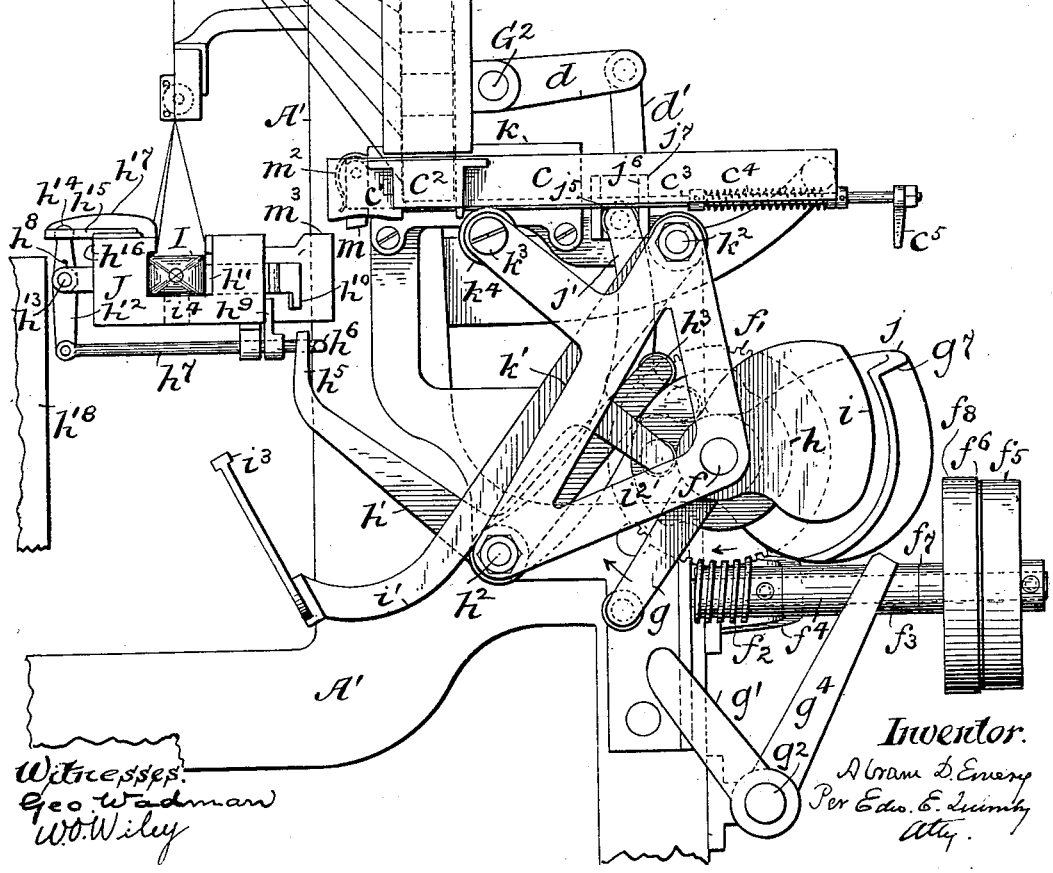

No. 626,860. Patented June 13, 1899.
A. D. EMERY.
STOPPING, CORRECTING, AND RESTARTING MECHANISM FOR LOOMS.
(Application filed Aug. 2, 1898.)
(No Model.) 7 Sheets—Sheet 6.
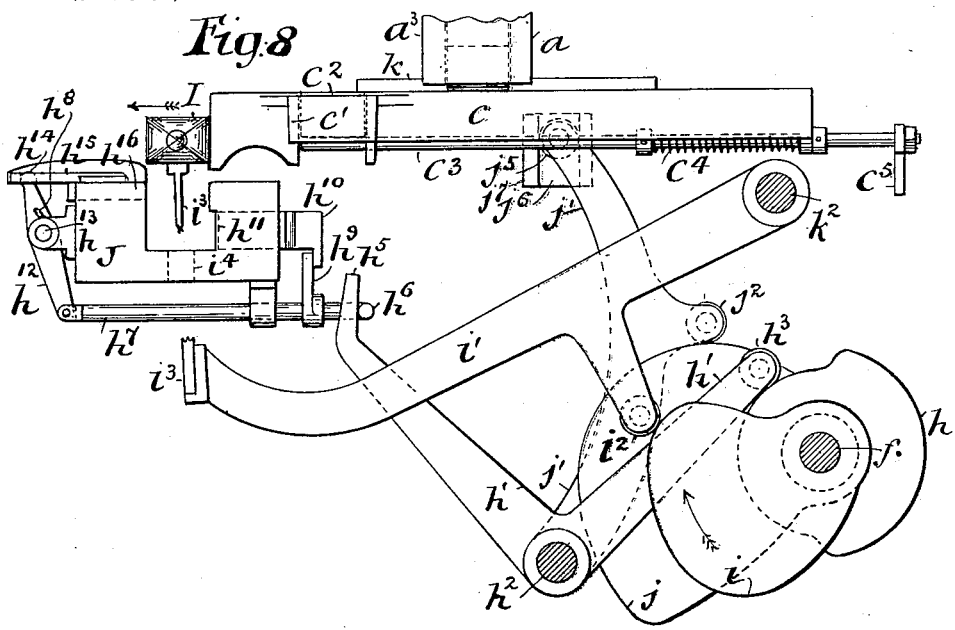
Witnesses.
Geo. Wadman
W. O. Wiley
Inventor:
Abram D. Emery,
Per Edw. E. Lumby
Atty.

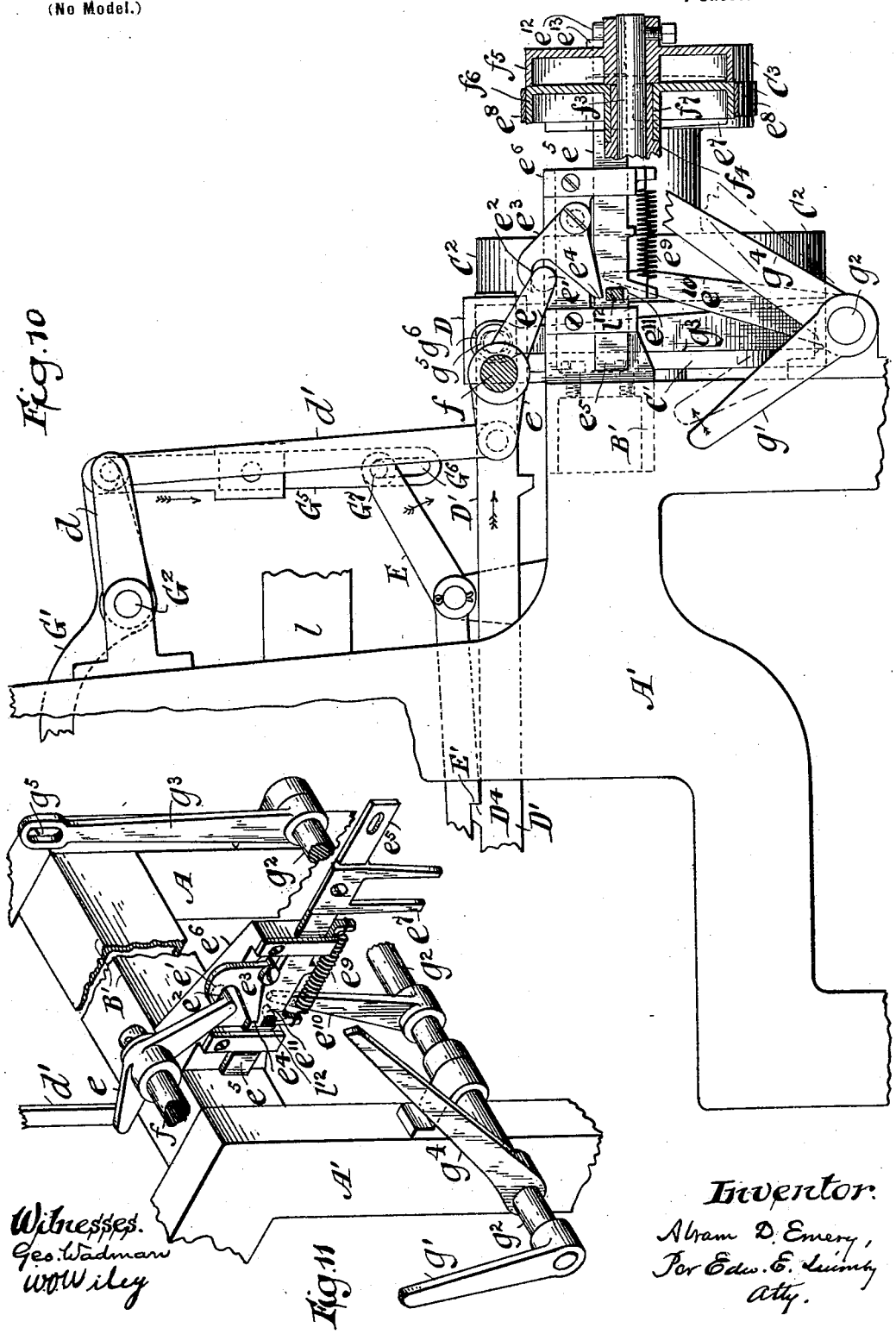

UNITED STATES PATENT OFFICE.

ABRAM D. EMERY, OF TAUNTON, MASSACHUSETTS, ASSIGNOR TO THE UNIVERSAL LOOM COMPANY, OF NEW YORK, N. Y.

STOPPING, CORRECTING, AND RESTARTING MECHANISM FOR LOOMS.

SPECIFICATION forming part of Letters Patent No. 626,860, dated June 13, 1899.

Application filed August 2, 1898. Serial No. 687,557. (No model.)

*To all whom it may concern:*

Be it known that I, ABRAM D. EMERY, of Taunton, Massachusetts, have invented certain Improvements in Automatic Stopping, Correcting, and Restarting Mechanism for Looms, of which the following is a specification.

The improvement in looms forming the subject of this invention resides in automatic mechanism which whenever a weft-thread breaks or runs out stops the operative parts of the loom, ejects the shuttle from the box in which it has come to rest, introduces into said box another shuttle with a properly-threaded weft, and then restarts the operative parts of the loom. The "operative parts" of the loom thus referred to are the weaving instrumentalities, and it is believed that the automatic stopping of these instrumentalities upon the occurrence of a defect in their operation, followed by the automatic correction of such defect and the subsequent automatic restarting of the weaving instrumentalities, is entirely new. Hence the present invention in its broad aspect consists of the weaving mechanism of a loom, including a stop-motion for stopping the weaving mechanism upon the occurrence of a defect in its operation, in combination with a correcting mechanism acting automatically to correct such defect when the weaving mechanism is thus stopped, and a restarting mechanism acting automatically to restart the weaving mechanism into operation when such defect has been corrected.

It will be understood that the invention is not limited to the exact mechanism or means herein shown for accomplishing the described results, for, as will be obvious to those skilled in the art, the said results might without departure from the broad invention be automatically accomplished by the employment of forms of mechanical devices other than those herein shown. Thus in the present case the broad invention is illustrated in connection with a weft stop-motion, the particular defect requiring correction being that which arises from the breaking or running out of the weft-thread, either of which casualties results in automatically stopping the weaving instrumentalities of the loom and concurrently tripping into action the correcting mechanism, the correcting mechanism being in this case illustrated by the described means for ejecting from the lay the shuttle containing the more or less spent weft-bobbin and inserting into the lay a shuttle containing a full weft-bobbin, the restarting mechanism for restarting the weaving instrumentalities being automatically set in action at the conclusion of the performance by the correcting mechanism of the correcting function.

The accompanying drawings represent portions of an upright loom resembling that shown and described in Letters Patent of the United States No. 605,603, dated June 14, 1898, but containing mechanism embodying an illustration of the present invention.

Figure 2:
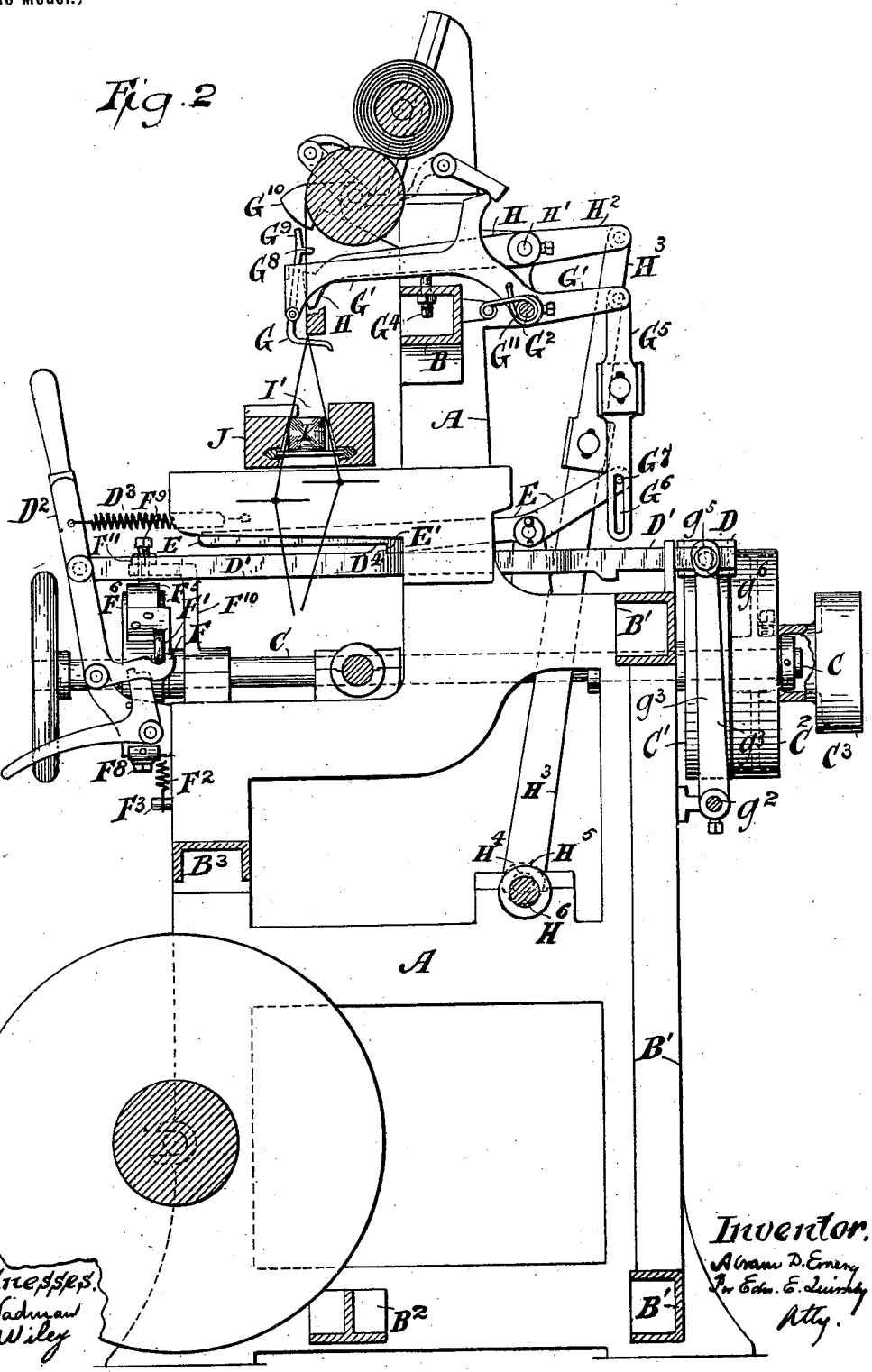
Figure 3:
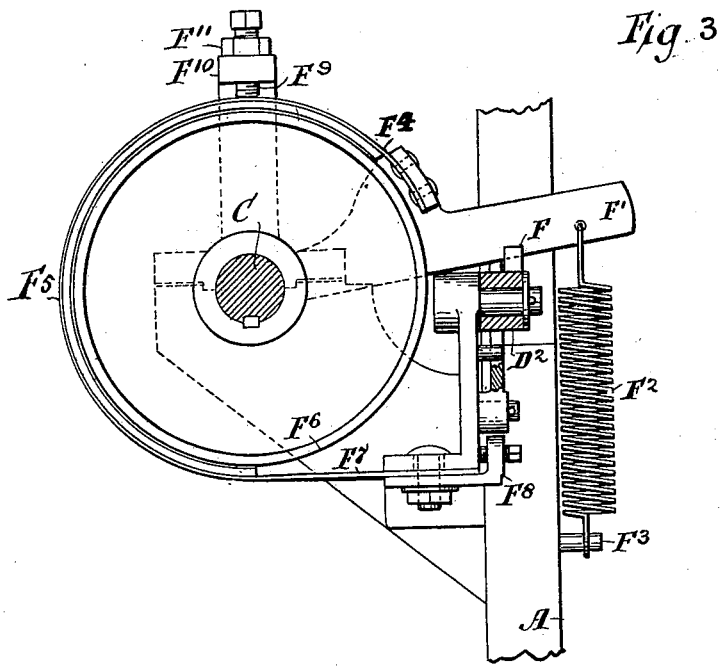
Figure 4:
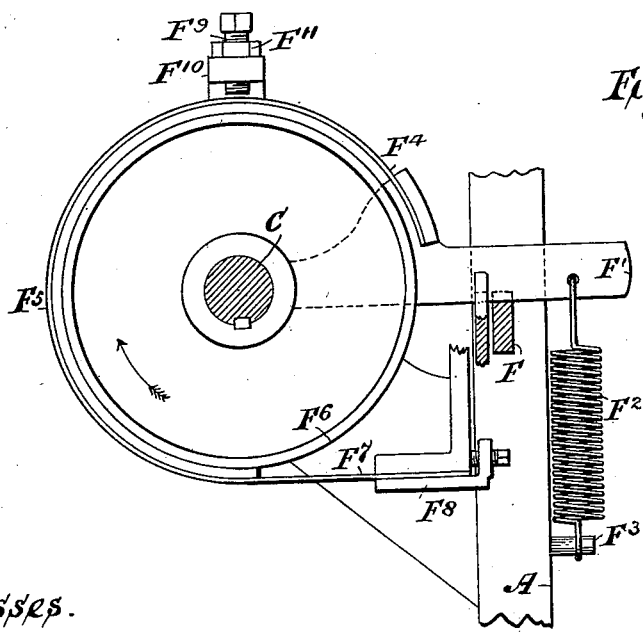

The drawings are as follows: Figure 1 is a broken-out top view of the loom, partly in section. Fig. 2 is a transverse vertical section of the loom, taken through the plane indicated by the dotted line $xx$ on Fig. 1. Figs. 3 and 4 are detail drawings of the brake mechanism, Fig. 3 showing the brake-strap released from the brake-wheel and Fig. 4 showing the brake-strap engaging the brake-wheel. Fig. 5 is a broken-out rear view of a portion of the loom, affording a view in elevation of the shuttle-changing mechanism. Fig. 6 is an elevation of a portion of the end of the loom, affording a face view of the cams for operating the shuttle-changing devices. Fig. 7 is an elevation, partly in section, showing details of the safety-stop for preventing the operation of the shuttle-changing mechanism in case the lay has not come to rest in the proper position. Fig. 8 is a detail showing in elevation the positions of the shuttle-changing cams at an early stage in the shuttle-changing operation. Fig. 9 is a similar elevation illustrating the positions of the parts at a later stage in the shuttle-changing operation. Fig. 10 is a transverse section taken through the vertical plane indicated by the dotted line $yy$ on Fig. 5, showing details of the restarting devices. Fig. 11 is a perspective view of mechanism for controlling the supplemental driving-belt which operates the shuttle-changing mechanism.

The successful accomplishment of the results sought for in the present invention requires the presence in the loom of a stopping mechanism susceptible of being tripped into action by the breaking or running out of the weft-thread and adapted to invariably bring the operative parts of the loom to rest with the shuttle and lay in prescribed positions. For effecting these results there may be employed a weft stop-motion and brake mechanism substantially like those shown and described in Letters Patent of the United States No. 605,601, dated June 14, 1898.

As will be seen, the drawings show portions of an upright loom-frame composed in part of the standards A A' and the horizontal members B B' B² B³. The main driving-shaft C is provided with the driving-pulley C' and the loose pulley C², to the hub of which is secured the supplemental pulley C³. The position of the main driving-belt is governed by the belt-shifter D, carried at the rear end of the horizontal slide-bar D', which at its front end is pivoted to the hand-lever D². The lever D² has attached to it the free end of a contracting spiral spring D³, the opposite end of which is secured to the loom-frame.

When the loom is running normally, the main driving-belt, as shown in Fig. 1, is retained in engagement with the driving-pulley C' by means of the main trip-lever E, pivoted at the rear end to the frame of the loom and having near its forward end a shoulder E', which engages the shoulder D⁴ on the slide-bar D'.

When the hand-lever D² is swung outward into the position in which it is represented in Fig. 2, the finger F, projecting laterally from its hub, engages and lifts the radius-arm F', which is loosely hung on the main driving-shaft C and which is constantly subjected to the downward pull of the contracting spiral spring F², having its upper extremity connected with the free end of the radius-arm F' and its opposite extremity secured to the pin F³, affixed to the frame of the loom. The radius-arm F' has affixed to it the end F⁴ of the brake-strap F⁵, which surrounds the greater part of the brake-wheel F⁶ and has its opposite end F⁷ connected to the adjustable clamp F⁸, attached to the frame of the loom.

A feature of the present invention consists of a brake-strap clearer for insuring the complete clearance of the brake-strap from the brake-wheel whenever the brake-releasing mechanism is actuated. A suitable device for this purpose, herein shown by way of illustration, consists of the screw-bolt F⁹, inserted through a vertical aperture in the arm F¹⁰, connected with a stationary part of the loom. A jam-nut F¹¹ serves to hold the screw-bolt F⁹ in position.

When the radius-arm F' is oscillated to release the brake, the portion of the brake-strap adjacent to its free end—that is, the end attached to the arm F'—after moving clear from the brake-wheel encounters the stop presented for it by the lower end of the screw-bolt F⁹, from which it results that the brake-strap, which is a flexible metallic band, is made to spring into a position in which it is approximately concentric with the periphery of the brake-wheel and is wholly cleared therefrom.

The device of a stop arranged near the free end of the brake-strap to deflect the brake-strap when released into a position approximately concentric with the brake-wheel is important not only because it prevents the heating which would be caused if any portion of the brake-strap were permitted to be in contact with the brake-wheel while the loom is running, but also because it facilitates the nearly simultaneous application to the brake-wheel of the entire operative portion of the brake-strap.

The relative positions of the members of the brake mechanism when the loom is in normal operation are indicated in Fig. 3.

The stopping of the loom involves the lifting, either manually or otherwise, of the forward end of the main trip-lever E. This disengages the shoulder E' from the shoulder D⁴, and thus releases the belt-shifter slide-bar D' to the action of the contracting spring D³. The spring D³ then pulls the slide-bar D' backward and shifts the belt to the loose pulley C² and at the same time swings backward the hand-lever D², swinging downward the finger F, and thereby releasing the radius-arm F' to the influence of the spring F². The brake-strap is thereby tightened around the brake-wheel in part by the contractile force of the spring F² and in part by the frictional influence upon the brake-strap of the periphery of the brake-wheel which rotates, as indicated by the curved arrow on Fig. 4, in such direction as to make that frictional influence tend to pull the brake-strap away from its fixed end F⁷, and thus cause it to tighten itself upon the brake-wheel. The effectiveness of the strap-brake thus organized is such that by varying the position of the adjustable clamp F⁸ the operative stress of the spring F² can be so regulated with relation to the speed at which the loom is running as to always effect the stopping of the loom at the expiration of a predetermined period after the belt-shifter and brake-strap have been released by the tripping of the main trip-lever E, and the loom can thus always be brought to rest with its parts in a prescribed position. The tripping of the main trip-lever E is automatically effected by the operation of the herein-described weft stop-motion whenever a weft-thread breaks or runs out.

The weft stop-motion embraces the weft-fork G, pivoted to the front end of the lever G', which is affixed to the rock-shaft G², having its bearings in brackets attached to the loom-frame. An adjustable screw-bolt G⁴, extending upward from the girder B, acts as a stop to limit the range of downward swing of the lever G'. The link G⁵, connected at its upper end to the lever G', is provided near its lower end with the longitudinal slot $G^6$ for admitting a pin $G^7$, affixed to and projecting laterally from the trip-lever E.

When the lay ascends, the weft-thread, if present, is carried into collision with the lower end of the weft-fork G, and thereby tilts the weft-fork out of the position in which it is represented in Fig. 2, thus clearing the backwardly-turned finger $G^8$ of the shank of the weft-fork from the path of motion of the free end of the constantly-vibrating lifting-arm H, which is secured to one end of a rock-shaft H′, mounted in a bracket projecting laterally from the loom-frame. The opposite end of said rock-shaft has secured to it a shorter arm $H^2$, which is pivotally connected with the upper end of the link $H^3$, the lower end of which is engaged by the crank-pin $H^4$, projecting from the head $H^5$, affixed to the end of the shaft $H^6$, upon which the main cams of the loom are mounted.

The vibrations of the lifting-arm H are so timed that the latter part of the upward excursion of its free end is coincident with the beat which ensues immediately after the shuttle I has been boxed in the shuttle-box I′ adjacent to the fork G. If the weft-thread has run out or has been broken, the weft-fork, under the influence of gravity, retains the position in which it is represented in Fig. 2, so that its backwardly-turned finger $G^8$ will be caught by the free end of the lifting-arm H. Thus during the concluding part of the upward movement of the free end of the arm H the fork G will be carried upward, thereby so vibrating the lever G′ as to effect the disengagement of the trip-lever E from the shoulder $D^4$ on the slide-bar D′. The belt-shifter and brake being thus released to the influence of their respective springs will bring the operative parts of the loom to rest by the time the lay J has reached its lower position. During this time the shuttle will be thrown from the box I′ into the box at the opposite end of the lay, which is its appropriate position for submission to the action of the shuttle-changing mechanism. After the fork has been carried upwardly sufficient to trip and release the slide-bar D′ the continued upward movement of the free end of the lifting-arm H will cause the upper end $G^9$ of the shank of the fork to be carried into collision with the cam-shaped edge of the plate $G^{10}$, affixed to the frame of the loom, which will effect the disengagement of the finger $G^8$ from the free end of the lifting-arm H just before the complete stoppage of the loom. Consequently the rock-shaft $G^2$ is released to the influence of a coil-spring $G^{11}$, tending to restore the parts connected with the said rock-shaft to their normal position for the automatic restarting of the loom by the shuttle-changing mechanism.

The mechanism for automatically supplying the filling embraces the vertical shuttle-magazine $a$, adapted to contain a plurality of shuttles. Each shuttle is intended to contain a full bobbin or cop $a′$ of weft, the free end $a^2$ of which is led from the pot-eye through the open side $a^3$ of the shuttle-magazine and is given several turns around the pin $b$, projecting from the loom-frame.

Beneath the magazine is a transferrer $c$, which is adapted to be reciprocated in a horizontal plane. On its front side the transferrer $c$ is provided with the inwardly-turned arms $c′ c′$, forming the end boundaries of a shuttle-receiver $c^2$, which when the transferrer occupies its normal position is immediately beneath the shuttle-magazine, so that the lowermost shuttle in the magazine will drop into it. At the appropriate time the transferrer $c$ is moved forward to deliver to the lay the shuttle contained in the shuttle-receiver $c^2$. Endwise-sliding rods $c^3 c^3$ are supported on the under side of the transferrer and under the influence of the springs $c^4 c^4$ are made to project across the bottom of the receiver $c^2$, and thus serve to sustain the shuttle therein until at a prescribed stage in the forward excursion of the transferrer $c$ the arm $c^5$, affixed to and projecting downwardly from a cross-bar secured to their rear ends, is brought into collision with a stop consisting of the collar $k^5$ on the horizontal bar $k^2$, (see Fig. 5,) which operates to detain the rods $c^3 c^3$ and permits the shuttle to be delivered from the receiver $c^2$ to the lay. As the transferrer moves backward the rods $c^3 c^3$ are released to the influence of the springs $c^4 c^4$, and thus made to resume their positions across the bottom of the receiver $c^2$ in time to act as supports for the next shuttle dropped into the receiver $c^2$.

When the weft stop-motion is acting to trip the main belt-shifter and brake, motion is transmitted from the radius-arm $d$, affixed to the rock-shaft $G^2$, through the link $d′$ to the rock-lever $e$, which is loosely mounted on a supplemental cam-shaft $f$ and provided with a laterally-extending pin $e′$ to engage a shoulder $e^2$ of a gravity-pawl $e^3$ and raise the latter clear of the shoulder $e^4$, formed on the slide-bar $e^5$.

The slide-bar $e^5$ is mounted in a bracket $e^6$, affixed to the loom-frame, and is provided with a belt-shifter $e^7$ to govern the position of a supplemental driving-belt $e^8$, which operates the shuttle-changing mechanism.

A contracting spiral spring $e^9$ has one end secured to the bracket $e^6$ and its opposite end to the slide-bar $e^5$. When the pawl $e^3$ is raised, the spring $e^9$ pulls the slide-bar $e^5$ into position to set the shuttle-changing mechanism into operation.

A radius-arm $e^{10}$, swayed on shaft $g^2$ by the shuttle-changing mechanism during the final portion of its operation, as hereinafter described, catches a pin $e^{11}$, projecting from the slide-bar $e^5$, and thereby moves the slide-bar $e^5$ back into position to be reëngaged by the pawl $e^3$. The slide-bar $e^5$ has adjustably affixed to its rear end a curved strip of resilient material $e^{12}$, carrying at its free end a suitable brake-block $e^{13}$ for preventing the motion of the shuttle-changing mechanism after the supplemental driving-belt has been shifted.

A worm-wheel $f'$, affixed to the cam-shaft $f$, is engaged by a worm $f^2$, secured to the supplemental driving-shaft $f^3$, mounted in a tubular bracket $f^4$, affixed to the loom-frame. Upon the supplemental driving-shaft $f^3$ is a fixed pulley $f^5$ and alongside of it a loose pulley $f^6$, the latter being loosely mounted upon the turned-down portion $f^7$ of the tubular bracket $f^4$.

The supplemental driving-belt $e^8$ normally engages the fixed pulley $f^5$ and extends to and around the pulley $C^3$, secured to or formed integrally with the main loose pulley $C^2$, from which motion is derived to operate the shuttle-changing mechanism and automatically restart the loom whenever the main belt is shifted to the main loose pulley by the operation of the weft stop-motion.

It will be seen that whenever the main belt is shifted otherwise than by the operation of the weft stop-motion the shuttle-changing mechanism remains unaffected.

During the normal operation of the loom while the cam-shaft $f$ is being prevented from rotation by the engagement of the pawl $e^3$ with the shoulder $e^4$ the supplemental driving-belt is held on the loose pulley $f^6$. The supplemental cam-shaft $f$ makes one complete revolution, during which the cams mounted upon it perform their various functions in effecting the discharge of the shuttle from the box in which it has come to rest and the introduction of another shuttle in its place.

During a prescribed part of the concluding portion of the rotation of the supplemental cam-shaft $f$ the restarter $g$, which is a radius-arm affixed to the said shaft $f$, by engaging the radius-arm $g'$, affixed to the horizontal rock-shaft $g^2$, imparts a rocking motion to the said rock-shaft $g^2$ and corresponding swaying motions to the radius-arms $e^{10}$, $g^3$, and $g^4$, which are also affixed to the rock-shaft $g^2$. The function performed by the radius-arm $e^{10}$ when thus swayed is the moving back of the slide-bar $e^5$, as hereinbefore mentioned.

The radius-arm $g^3$ is provided with a slot $g^5$, which when the radius-arm $g^3$ is thus swayed by its engagement a pin $g^6$, affixed to and projecting from the main belt-shifter D, pushes the slide-bar D' forward, and by thus shifting the main belt and loosening the brake-strap from the brake-wheel restarts the operative parts of the loom. The radius-arm $g^4$ when thus swayed serves as a dog which by engaging a shoulder $g^7$ on the cam $j$ positively prevents the rotation of the shuttle-changing mechanism during the normal operation of the weaving instrumentalities. Such rotation will ordinarily be prevented by the brake $e^{13}$, but the radius-arm $g^4$ may, if desired, be employed for abundant caution.

The parts are so timed that the shoulder E' of the trip-lever E drops behind the shoulder $D^4$ on the slide-bar D', and the pawl $e^3$ drops behind the shoulder $e^4$ on the slide-bar $e^5$ just before the restarter $g$ clears the radius-arm $g'$, thereby keeping the operating parts of the loom in action until the main belt-shifter and brake are again tripped. In the meantime the brake-block $e^{13}$, having been carried by the slide-bar $e^5$ into contact with the face of the fixed pulley $f^5$, arrests the rotation of the cam-shaft $f$, which remains stationary until again set in motion in consequence of the absence of a weft-thread, as described.

It is essential that the restarter $g$ shall continue its swaying movement to some extent after having effected the restarting of the loom in order that the radius-arm $g'$ may be free to be swayed into the position in which it is indicated in dotted lines in Fig. 10. The supplemental driving-belt $e^8$ will have been shifted by this time onto the loose pulley $f^6$, but the *vis inertiæ* of the moving parts suffices to furnish the small amount of force needed to prolong the rotation of the shaft $f$ until the free end of the restarter $g$ has been carried around beyond the path of motion of the free end of the radius-arm $g'$, so that the radius-arm $g'$ will not encounter the restarter when again swayed by the rock-shaft $g^2$ the next time the shuttle-changing mechanism is started into operation.

At appropriate stages in the single revolution of the cam-shaft $f$ the shuttle-changing cams thereon perform their several functions in due order, as follows: First the clearer-cam $h$ operates to bring about the clearance of the path through which the spent shuttle is ejected from and a shuttle with a full bobbin of weft is subsequently introduced into the shuttle-box at the end of the lay in front of the shuttle-magazine. This is effected by the appropriate rocking of the bell-crank lever $h'$, loosely mounted on the fixed bar $h^2$. The cam-follower $h^3$, at the rear end of the bell-crank lever $h'$, is made to constantly bear upon the cam $h$ by the suitably strong torsion-spring $h^4$, having one of its extremities fixed to the bell-crank lever $h'$ and the other to the bar $h^2$. When the cam-follower $h^3$ drops upon the depressed part of the cam $h$, the finger $h^5$, at the forward end of the bell-crank lever $h'$, swings backward. When the lay is down, the finger $h^5$ occupies a position which enables it in its backward swing to engage the laterally-projecting shoulder or bend $h^6$ at the rear end of the horizontal reciprocable shaft $h^7$, loosely mounted upon the under side of the lay and subject to the influence of the retracting-spring $h^8$. A finger $h^9$, affixed to and projecting upwardly from the shaft $h^7$, is adapted to engage an arm $h^{10}$, affixed to the binder or spring-check $h^{11}$, which is one of the appurtenances of the shuttle stop-motion with which the loom is equipped. The lower part of the rear wall of the shuttle-box is recessed to contain the binder, so that the shuttle when being lowered into the box will not encounter any part of the heel of the binder. At its forward end the shaft $h^7$ is pivotally connected with the crank-arm $h^{12}$, projecting downwardly from a rock-shaft $h^{13}$, in connection with which the said retracting-spring $h^8$ is arranged. The rock-shaft $h^{13}$ is mounted in bearings upon the front side of the lay and is provided with two upwardly-extending arms $h^{14}$ $h^{14}$, suitably engaging slots in the arms $h^{15}$ $h^{15}$, affixed to the movable cap $h^{16}$, which when the parts are in normal position project partially over the shuttle-box. When the finger $h^5$ swings backward, the binder $h^{11}$ is removed from the rear wall of the shuttle-box, while the cap $h^{16}$ is moved forward, so that it no longer overhangs the shuttle-box. The path being thus cleared, the next step is to eject the spent shuttle. This function is performed by the ejector-cam $i$, which at the proper time rocks upward the ejector-arm $i'$, carrying the cam-follower $i^2$, which is made to constantly bear against the cam $i$ by the influence of gravity upon the ejector-arm $i'$. At its forward end the arm $i'$ is bifurcated to form the two lifters $i^3$ $i^3$, which when the arm $i'$ rises enter through the usual slot $i^4$ in the bottom of the box in which the spent shuttle is contained and elevate the spent shuttle into position to be pushed off sidewise over guide-strips $h^{17}$ into a box $h^{18}$ by the forward end of the transferrer $c$ during the latter part of the forward movement thereof. Preferably the cam $i$ is so shaped as to retain the lifters $i^3$ $i^3$ at the level represented in Fig. 8, so that the shuttle contained in the receiver $c^2$ will be lodged upon the tops of the lifters $i^3$ $i^3$ and be thereafter gradually lowered into the shuttle-box as the arm $i'$ under the influence of gravity is permitted to fall by the cam $i$.

The timely forward movement of the transferrer $c$, enabling it to knock off the spent shuttle from the lifters $i^3$ $i^3$, is effected by the feed-cam $j$, which acts upon the cam-follower $j^2$, carried by the arm $j'$, loosely mounted upon the stationary bar $h^2$ and having affixed to it one end of a suitably strong torsion-spring $j^3$, the opposite end $j^4$ of which is affixed to the bar $h^2$. At its upper end the arm $j'$ carries the roller $j^5$, which engages a vertical groove $j^6$ in a bracket $j^7$, affixed to the under side of the transferrer $c$.

The inner side of the transferrer is provided with a downwardly-projecting flange $j^8$, adapted to slide in the horizontal guide $j^9$, formed in the inner upright member $k$ of the supplemental frame in which the shuttle-changing mechanism is mounted. The said frame consists of the inner upright member $k$, which is secured to the standard A' of the main frame, as shown in Fig. 6, and which is united to the outer upright member $k'$ by the horizontal bar $h^2$ and by the horizontal bar $k^2$. The bar $k^2$ affords the axis for the ejector-arm $i'$. The upright member $k'$ carries the horizontal stud $k^3$, affording the axis for the roller $k^4$, supporting the outer side of the transferrer $c$.

The cam $j$ is provided with a concentric portion for the purpose of detaining the transferrer $c$ in its forward position for a sufficient length of time to permit the new shuttle to be lowered from the receiver $c^2$ to the shuttle-box.

Care has thus been taken to describe certain features of the loom which do not of themselves constitute part of the present invention, because the shuttle-changing operation is performed while the operative parts of the loom are at rest in prescribed positions, and it hence follows that the instrumentalities for stopping the operative parts of the loom must, so far as possible, operate to bring about such stoppage with the lay down and with the shuttle in the box at the end of the lay in front of the shuttle-magazine. If, however, from any cause the lay should not come to rest in the proper position, there is provided a safety device for preventing the shuttle-changing mechanism from acting. For this purpose there is pivoted to a bracket $l$, secured to the loom-frame, a lever $l'$, whose lower end is engaged and rocked by a wiper-cam $l^2$, projecting from the face of a collar $l^3$, affixed to the supplemental cam-shaft $f$. A contracting spiral spring $l^4$, having one end secured to the extension $l^5$ of the lever $l'$ and its other end secured to the extremity of the shank $l^6$ of the inverted-T lever $l^7$, tends to rock the lower end of the lever $l'$ against the supplemental cam-shaft $f$. An arm $l^8$, projecting laterally from the lever $l'$, is pivotally connected to a lever $l^9$, whose lower end is provided with an adjustable stop comprising a screw-bolt $l^{10}$, secured in a threaded aperture by a jam-nut $l^{11}$. This stop engages an arm $l^{12}$, extending from the slide-bar $e^5$, and is held normally in contact therewith by means of a contracting spiral spring $l^{13}$, one end of which is secured to an arm $l^{14}$ of the lever $l^9$ and its opposite end to a finger projecting upward from the arm $l^{12}$. The lower end of the lever $l^9$ will therefore partake of the to-and-fro motions of the slide-bar $e^5$ and its upper end will be rocked between two positions, one of which is shown by full lines and the other by dotted lines in Fig. 7. The inverted-T lever $l^7$ is pivoted between its ends to the bracket $l$, and one of its arms $l^{15}$, under the influence of the spring $l^4$, may rest upon a stop $l^{16}$, in which case the extremity of the arm $l^{15}$ intersects the path of motion of the upper end of the lever $l^9$, as shown by the dotted lines in Fig. 7. The end of the opposite arm $l^{17}$ of the lever $l^7$ is adapted to be engaged by a toe $l^{18}$, secured to the lay, so that when the lay is within about three-sixteenths of an inch of its lowermost position the end of the arm $l^{15}$ will have been rocked upward out of the way of the lever $l^9$. Should the lay not be in its proper position when the loom stops and the slide-bar $e^5$ is tripped, the relative positions of the adjacent ends of the arm $l^{15}$ and the lever $l^9$ will be as indicated by the dotted lines in Fig. 7. Under these circumstances as soon as the shuttle-changing mechanism begins to move the wiper-cam $l^2$ will rock the lever $l'$, by the pull of which the upper end of the lever $l^9$ will be carried against the end of the arm $l^{15}$, which then becomes the fulcrum of the lever $l^9$, so that by the continued pull of the lever $l'$ the lower end of the lever $l^9$ is made to move the slide-bar $e^5$ back, and thereby shift the supplemental driving-belt $e^8$ to the loose pulley $f^6$ and prevent further movement of the shuttle-changing mechanism. If the lay be in proper position, the arm $l^{15}$ will be swung out of the way, so that the upper end of the lever $l^9$ will be left free to swing instead of the lower end, with the result that the shuttle-changing mechanism will not be interfered with.

For abundant caution in case the described safety device should fail to act properly there is provided a protector consisting of a hinged blade $m$, mounted between lugs $m'$, formed on the front edge of the transferrer $c$ and free to turn in one direction against a spring $m^2$. If the lay is not in proper position, the front edge of the blade $m$ will be carried into collision with a stop $m^3$, affixed to the lay. Such collision prevents further forward movement of the transferrer $c$ and compels the supplemental driving-belt $e^8$ to slip until it runs off the pulley which drives it.

What is claimed as the invention is—

1. In a loom, instrumentalities for temporarily bringing the operative parts of the loom to rest with the lay and shuttle in prescribed positions; instrumentalities adapted to act while the operative parts of the loom are thus at rest for automatically discharging the shuttle from the lay and introducing into the lay another shuttle, and then restarting the operative parts of the loom, and means operative upon the failure of the weft to trip said instrumentalities into action.

2. In a loom, driving mechanism for driving the operative parts of the loom; means operative upon a failure of the weft for temporarily bringing the operative parts of the loom to rest with the lay and shuttle in prescribed positions; instrumentalities adapted to act while the operative parts of the loom are thus at rest, for discharging the shuttle from the lay, for introducing another shuttle into the lay, and for then restarting the operative parts of the loom; supplemental driving mechanism for driving said instrumentalities, and a pawl normally holding said supplemental driving mechanism at rest, and means operative upon a failure of the weft to temporarily release said supplemental driving mechanism into action.

3. In a loom, a shuttle-magazine; a lay; means acting upon a failure of the weft to bring the operative parts of the loom to rest with the lay down and the shuttle in the box at the end of the lay nearer the magazine; instrumentalities also acting upon a failure of the weft and while the operative parts of the loom are thus at rest to automatically discharge the shuttle from the lay, to transfer from the magazine to the lay another shuttle, and to then restart the operative parts of the loom.

4. In a loom, means acting upon the failure of the weft to bring the operative parts of the loom to rest with the lay and shuttle in prescribed positions; shuttle-changing mechanism and mechanism acting to restart the operative parts of the loom when the operative parts of the loom are thus at rest and consisting of the following instrumentalities, to wit, a supplemental cam-shaft; a clearer-cam mounted on said cam-shaft; means for withdrawing the binder and shuttle-box cap from their normal positions with relation to the box containing the shuttle which is to be discharged, and operative connections therefrom to said clearer-cam; an ejector-cam mounted on said cam-shaft; lifters for lifting upward the shuttle to be discharged from the shuttle-box; operative connections from said lifters to said ejector-cam; a feed-cam mounted on said cam-shaft; a reciprocable transferrer having a feeding movement for knocking the spent shuttle from said lifters and for supplying a fresh shuttle for introduction into the lay; connections between said transferrer and said feed-cam for imparting said feeding movement, and means for imparting the reverse movement to said transferrer; a restarting-cam mounted on said cam-shaft and connections therefrom to the belt-shifter bar of the loom for moving said shifter-bar into position to effect the restarting of the operative parts of the loom.

5. In a loom, a main driving mechanism for driving the operative parts of the loom; a shuttle-changing mechanism; a supplemental driving mechanism, operative when said main driving mechanism is at rest, for actuating said shuttle-changing mechanism and then restarting the said main driving mechanism; a tripper for tripping said supplemental driving mechanism into action, and a weft stop-motion for stopping said main driving mechanism and actuating said tripper whenever a weft-thread breaks or runs out.

6. In a loom, a main driving-shaft for driving the operative parts of the loom; means including a spring-actuated belt-shifter for stopping the rotation of said main driving-shaft; shuttle-changing mechanism adapted to act when said main driving-shaft is at rest; a normally stationary supplemental driving-shaft provided with a fast and loose pulley; a supplemental cam-shaft geared to said supplemental driving-shaft and operative during a single revolution for driving said shuttle-changing mechanism; connections from said supplemental cam-shaft to said belt-shifter for restarting said main driving-shaft during the concluding portion of the operative revolution of the said supplemental cam-shaft; a pawl for normally preventing the rotation of said supplemental cam-shaft while said main driving-shaft is in motion; a supplemental driving-belt adapted to bear upon said fast and loose pulleys and to slip on said fast pulley when said supplemental cam-shaft is prevented from rotation by said pawl, and means operative upon a failure of the weft for releasing said belt-shifter to the action of its spring and stopping the rotation of said main driving-shaft and for concurrently tripping said pawl and allowing said supplemental driving-shaft to make one revolution.

7. In a loom, in combination as herein set forth, weaving instrumentalities; a stop-motion for stopping said weaving instrumentalities in prescribed positions; shuttle-changing mechanism, and a protector for preventing the operation of said shuttle-changing mechanism if the said weaving instrumentalities are not in said prescribed position.

8. In a loom, a main driving mechanism for driving the weaving instrumentalities of the loom; a stop-motion for stopping the operation of said instrumentalities upon the occurrence of a defect in the operation thereof; a correcting mechanism for correcting such defect and restarting mechanism for restarting the said weaving instrumentalities; a supplemental driving mechanism, operative only when said weaving instrumentalities are at rest, for driving said correcting and restarting mechanism; means for subjecting said correcting and restarting mechanism to the action of said supplemental driving mechanism concurrently with the stopping of said weaving instrumentalities by said stop-motion, and means for throwing said supplemental driving mechanism out of action concurrently with the restarting of said weaving instrumentalities.

ABRAM D. EMERY.

Witnesses:
  H. J. FULLER,
  ESTELLE M. EMERY.